(No Model.)
I. H. DAVIS.
MOTOR ATTACHMENT FOR BICYCLES.
No. 568,164. Patented Sept. 22, 1896.
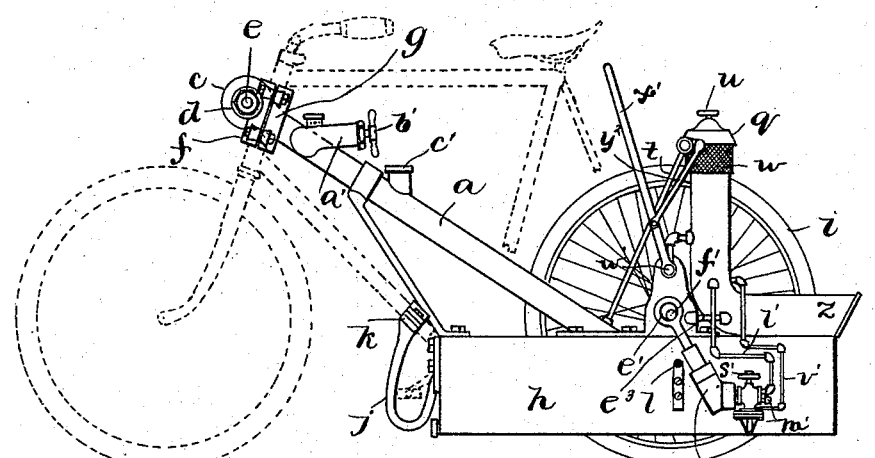
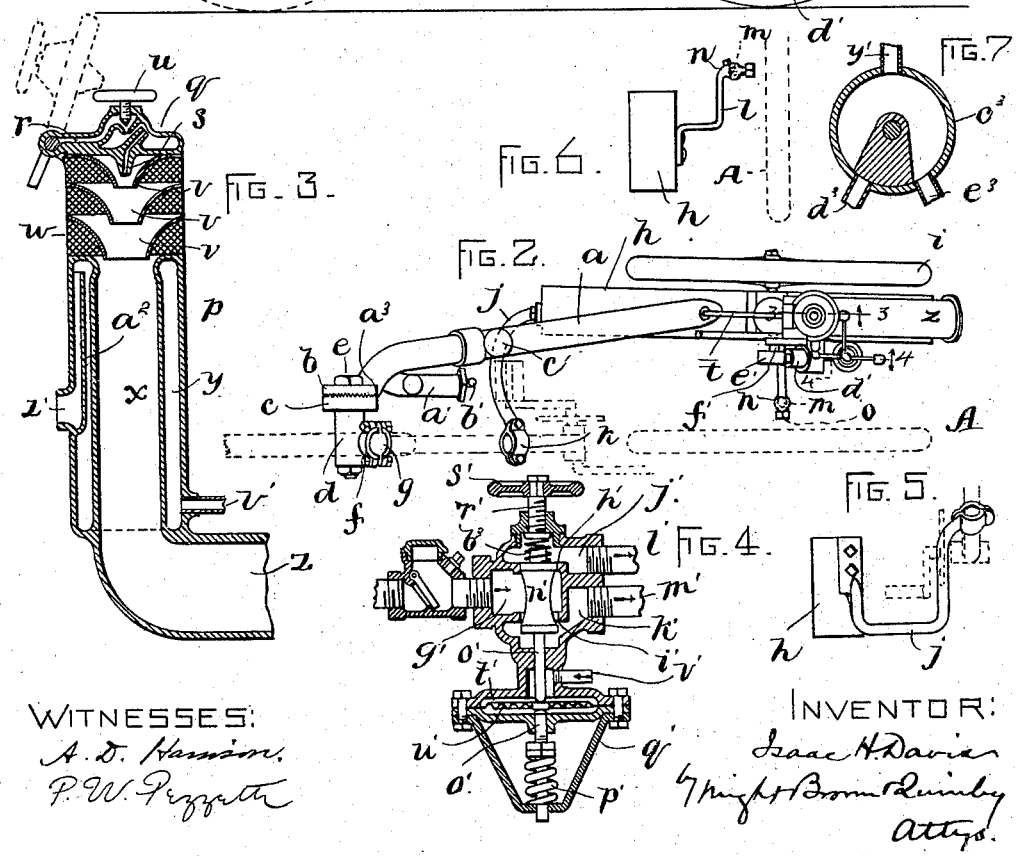
WITNESSES:
A. D. Harrison.
P. W. Pizzetti
INVENTOR:
Isaac H. Davis
Wright Brown Quinby
attys.

UNITED STATES PATENT OFFICE.

ISAAC H. DAVIS, OF BOSTON, MASSACHUSETTS.

MOTOR ATTACHMENT FOR BICYCLES.

SPECIFICATION forming part of Letters Patent No. 568,164, dated September 22, 1896.

Application filed June 11, 1896. Serial No. 595,086. (No model.)

*To all whom it may concern:*

Be it known that I, ISAAC H. DAVIS, of Boston, in the county of Suffolk and State of Massachusetts, have invented certain new and useful Improvements in Motor Attachments for Bicycles, of which the following is a specification.

The object of this invention is to provide a motor to be detachably secured to a bicycle of any standard make without interfering with the working parts of the same. In accomplishing this purpose it is also my object to so mount the motor on an attachable and detachable carriage that it will be entirely supported thereby, the carriage being provided with a driving-wheel, by means of which the bicycle may be propelled. The carriage should be of such construction as to carry a reservoir or tank for the engine if a motor of that type be used, and should be equipped with the proper power-controlling devices within reach of the rider.

Other objects which I have in mind are to provide the carriage which, as aforesaid, can be attached to a bicycle of any make or style with such means of attachment as to adapt it to ride easily over the unevenness of or obstructions in the road, and to so arrange the wheel of the same with relation to the wheels of the bicycle as to counteract the sidewise thrust which would be likely to follow if the axes of the said wheels were arranged in parallelism.

Other objects, likewise, are to construct the carriage and the parts as light as possible, so as to bear but little appreciable weight and strain upon the frame of the bicycle, since the latter is now usually built in such way as to sacrifice strength for lightness and make it dangerous to add much additional weight or strain thereto.

There are many other objects of my invention to which I shall not now refer, as they will be hereinafter made apparent.

To these ends my invention consists of a motor-carriage so constructed as to be quickly attachable to and detachable from the frame of a bicycle and as not to interfere with the operation of the pedals or the mounting and dismounting of the rider on and from the saddle.

The invention likewise consists of a motor-carriage for a bicycle detachable therefrom and provided with a motor and with a driving-wheel driven thereby, the carriage being connected with the bicycle-frame by braces.

The invention also consists of numerous other features of improvement, which I shall proceed to describe in detail, and set forth in the claims hereto appended.

Reference is to be had to the drawings, and to the letters marked thereon, forming a part of the specification, the same letters indicating similar parts and features, as the case may be, wherever they occur.

Of the drawings, Figure 1 is a side elevation of an attachable motor-carriage constructed in accordance with my invention, a portion of the bicycle to which it is attached being shown in dotted lines. Fig. 2 is a plan view of the same. Fig. 3 is an enlarged vertical section on the line 3 3 of Fig. 2 of the steam-generator which I have chosen to show as being adapted to be employed on the carriage. Fig. 4 is an enlarged sectional view on the line 4 4 of the automatic valve which I prefer to employ. Figs. 5 and 6 are detail views of the braces for connecting the motor-carriage with the frame of the machine. Fig. 7 illustrates in section the valve controlling the passage of steam into the engine.

In carrying out my invention I employ a tubular bar $a$, which constitutes in this embodiment of my invention a reservoir for the oil or other inflammable fluid to be used in generating steam in the engine or motor to be hereinafter described. It will be understood, however, that I do not limit myself to a steam-engine, as a gas, naphtha, or electric motor may be employed, and in that case the following devices would not be used. The tube $a$ is provided at its upper end with an ear $b$, serrated on its edge to engage the face of a circular flange $c$ on the end of a clamping-sleeve $d$.

$e$ is a pivot-bolt passing through the eye $b$ and the sleeve for pivoting the tube $a$ to the sleeve, the clamping-bolt holding the tube at any desired adjustment relatively to the said sleeve. The sleeve is cast to form half of a clamp $f$, the other half $g$ thereof being secured thereto by means of bolts around the steering-head of a bicycle, as shown in Fig. 1.

The tube $a$ is closed at both ends, the lower end being bolted to a tank $h$, the latter coacting with the tube to form a frame or carriage, in which is suitably mounted or journaled a driving-wheel $i$. Preferably the tube has a spring connection with the steering-head, so as to be flexibly connected thereto—that is to say, it is formed with a relatively thin spring portion $a^3$, the chamber in the tube ending just below said portion.

$j$ is a brace clamped at $k$ to one of the bars of the bicycle-frame and also bolted to the end of the tank $h$. It is curved, as shown, so as to be out of the path of the treadles when the latter are rotated. An additional brace $l$ is provided, extending from the tank to the axle of the wheel A, as shown in dotted lines in Fig. 2. This said brace is formed with a head or ball $m$ on the end, fitting in a socket $n$, which latter has a threaded aperture $o$, whereby it may be screwed on the ordinary threaded end of the wheel-axle.

From the foregoing description it will be seen that the whole carriage may be easily attached to a bicycle of any standard make or construction, and when secured in place extends to the right-hand side of the same far enough to allow the rider to easily dismount from the saddle and at the same time is so arranged as not to interfere with the operation of the pedals in case the motor gets out of order or the supply of steam be shut off.

It will be understood, as before stated, that I do not limit myself to any particular form of motor for driving the wheel $i$, since any may be employed which proves to be suitable for the purpose. I have chosen to show and to hereinafter describe one particular form of motor which I have found to be well adapted for the purpose, many of the parts being illustrated conventionally.

The tube $a$ provides, as I have hereinbefore explained, a reservoir for the reception of any inflammable liquid which it is desired to employ, while in the tank $h$ I store water to be generated into steam by means of a generator. (Shown enlarged in Fig. 3.) The said generator is indicated as a whole by $p$ and is suitably supported, it being shown as mounted upon the top of the tank $h$. It is provided with a hinged cap $q$, having ducts $r$ for the passage of the oil, the latter passing eventually to the orifice or burner $s$. The ducts in the cap are connected with the tube or reservoir $a$ by means of a pipe $t$, extending upward from the lower end thereof. The cap is provided with a regulating-screw $u$, by means of which the flow of oil through the cap to the burner may be regulated as desired.

$v$ $v$ $v$ are frusto-conical injectors inserted in the generator and are surrounded by a wire-gauze $w$ for the admission of air. The generator is formed with an inner chamber $x$, in which the combustion takes place, it being surrounded by an annular chamber $y$, in which the steam is generated. The walls of the chambers are made of some thickness in order to retain the heat. It is evident that instead of the chamber $y$, I may employ a coil of pipe in lieu thereof.

The combustion-chamber ends in an exhaust-chamber $z$, out of which the products of combustion and the vapors from the inflammable liquid and engine are discharged.

In order to force the liquid from the reservoir into the burner, I provide the upper end of said reservoir with an air-pump $a'$, the piston of which is operated by a handle $b'$, so that the rider may at any time increase the pressure within the reservoir to force the liquid through the pipe $t$. The liquid may be inserted through a suitable aperture, closed by a cap $c'$, as shown in Fig. 1.

Water is forced from the tank $h$ into the steam-chamber $y$ by means of a pump (indicated conventionally at $d'$) and operated by an eccentric $e'$ on the engine-shaft $f'$. Between the pump and the generator I place an automatic valve mechanism. (Illustrated in Fig. 4.)

The valve-casing is constructed to form a chamber $g'$, into which the water from the pump $d'$ is forced, and which is formed with two outlets $h'$, leading into a duct $j'$, and $i'$, leading into a duct $k'$. The duct $j'$ communicates with the steam-chamber $y$ in the generator by means of a pipe $l'$, while the duct $k'$ communicates directly with the tank $h$ by means of a pipe $m'$.

$n'$ is a valve in the chamber $g'$ and adapted to close either one of the two ports or outlets, the valve-stem $o'$ passing down through the casing and being held in its normal uppermost position by means of a spring $p'$, having lower end abutting against a brace $q'$, bolted to the lower end of the valve-casing. When the valve is in its normal position, the port $i'$ is closed and the water is forced through the port $h'$ and through the pipe $l'$ into the steam-chamber $y$, where it is instantly flashed into steam, as will be hereinafter described; and when the said valve is in its lowermost position, as shown in Fig. 4, the port $h'$ is closed and the water passes through the pipe $m'$ into the tank, thus keeping up a constant circulation. A regulating-screw $r'$ is tapped into the top of the valve-casing, and by means of it the valve $n'$ may be held at any desired position, there being a hand-wheel $s'$ on the said screw within reach of the rider of the bicycle.

$b^3$ is a spring inserted between the valve and the screw $r'$, and is designed to counteract to some extent the pressure of the spring $p'$, before referred to. It is evident that by adjusting the screw $r'$ by means of the hand-wheel $s'$ the pressure of the spring $p'$ may be varied to suit the requirements of any particular occasion. For instance, in many cases the rider will ignite the flame at the burner and will wait for the generation of sufficient steam before he admits the latter to the engine, during which time he will employ the pedals. In such cases he forces the screw down to entirely close the outlet $h'$, so as to cause the water to circulate through the tank, and in this way by cutting off the entrance of water into the steam-chamber the latter may be quickly heated to the desired point and the requisite pressure of steam be obtained. When this has been done, he unscrews the regulating-screw until a proper tension of the spring is obtained to allow the pump to inject the proper amount of water into the steam-chamber. Again, in climbing a hill, when a greater pressure of steam is required, the regulating-screw is drawn practically to its uppermost position, allowing the spring $p'$ to exert its entire strength in holding up the valve $u'$ to close the outlet $i'$. In order, however, to render the employment of the regulating-screw practically unnecessary, I employ means for causing the valve to operate automatically. The casing is constructed to form a chamber $t'$ to receive a diaphragm $u''$, which is secured to the valve-stem $o'$. A pipe $v'$ connects the steam-chamber $y$ with the chamber $t'$, so that when the pressure in the said steam-chamber reaches a predetermined point it causes the diaphragm to be depressed, drawing the valve down, so as to partially or entirely, as the case may be, cut off the flow of water into the said steam-chamber and to cause it to return directly to the tank. As soon as the steam pressure is relieved, however, the spring $p'$ raises the valve and allows the pump to inject the water into the steam-generating chamber.

The steam from the generating-chamber passes through a pipe $y'$ into an engine $t^2$, which is mounted upon the tank $h$, and which may be of any kind or character that may be desired. The motor or engine is conventionally illustrated, and I have not shown its internal construction, since it, *per se*, forms no material part of my invention and may be replaced by any other one performing the same functions. The wheel $i$ is mounted on the crank-shaft $f'$, before referred to. In order to regulate the passage of steam into the engine, I employ a shut-off valve $w'$, under the control of a lever $x'$, extending up into position to be grasped by the rider. A link $y^2$ connects the lever with the pivoted cap $q$, so that when the lever is shifted to shut off steam the cap is swung to an open position. The valve mechanism is shown in Fig. 7. The valve-casing $c^3$ is cylindrical, to provide a chamber into which steam is admitted through the pipe $y'$. The chamber is provided with an outlet $d^3$, leading to the engine or engine-valve box, as the case may be, and with an outlet $e^3$, leading into the exhaust $z$ below the generator, into which exhaust the exhaust-steam is also discharged from the engine.

I shall now proceed to describe the method of operating the various parts for the generation of power to drive the wheel $i$.

The tank having been partially filled with water and the reservoir having received a sufficient quantity of inflammable liquid, the rider proceeds to put the latter under pressure by means of the air-pump $a'$. The liquid is forced up through the pipe $t$ into the ducts of the hinged cap and is ignited by the rider at the burner $s$. The lever $x'$ is operated to open the stem-valve $w'$ into the engine and to throw the cap $q$ down into place, and the valve $n'$ is forced down by the regulating-screw $r'$. Then the oxygen of the air uniting with the flame causes an intense combustion in the combustion-chamber $x$, and as the cap $q$ is heated the oil is transformed into gas before it is injected into the said chamber. The water that is in the steam-chamber is flashed into steam, which passes into the engine to operate it. When the proper pressure is reached, the screw $r'$ is turned to allow the water to flow into pipe $l'$, and the water will be injected in proper quantities into the steam-chamber, where it will be instantly changed into steam because of the intense heat therein. When the pressure is sufficient, it will, as aforesaid, shift the valve $n'$ and cause the passage of the water from the pump $d'$ directly back to the tank until it is reduced, when the water will be again injected into the steam-chamber. When the rider wishes to dismount, he throws the lever $x'$ backward, which shuts off the steam from the engine and opens the outlet to the exhaust, and raises the cap $q$, so that the flame may be discharged into the atmosphere without being extinguished. The steam-chamber is provided with a baffle-plate $a^2$ in front of the steam-outlet $z'$, so that no water will pass out therethrough. It will be seen that I so connect the motor-carriage with the frame of the bicycle that the axis of the carriage-wheel is at a slight angle to the axle of the rear wheel of the bicycle, the two said wheels converging to a point in the rear. Thus I provide against the side thrust that would be experienced if the wheels were in parallelism.

From the foregoing it will be likewise apparent that I provide an extremely simple and light device which can be attached to a bicycle of any of the ordinary kinds. The carriage is arranged on the right side of the rider, so that the right hand may be used for controlling the power, the power-controlling levers and handles all extending to a point within easy reach.

The braces and connecting-rods are all so arranged that the carriage may be easily adjusted and will easily adapt itself to the surface of the ground. The braces are also so placed and constructed as to interfere in no wise with the proper working of the pedals or the handle-bar, or to be in the way in case the rider wishes to dismount.

The carriage is attached to the head of the bicycle, and hence any pressure will be borne by the bicycle without straining the latter or interfering in any way with the comfort of the rider.

The valve mechanism, which is inserted between the pump and the steam-generator, is automatic in its operation, so that it injects into the steam-chamber only just that proper amount of water which will be transformed into the exact amount of steam required to economically drive the engine without having an excess of pressure. No more steam is generated than is required for immediate consumption, so that the rider may quickly start up the engine or quickly stop it when he finds it necessary to do so.

Having thus explained the nature of my invention and set forth a way of constructing and using the same, without, however, attempting to describe all of the forms in which it may be made or all the modes of its use, I now declare that what I claim is—

1. An attachment for a bicycle, consisting of a carriage adapted to be connected to the frame of the same, and having a motor thereon for propelling the bicycle, in addition to the pedals.

2. An attachment for a bicycle, consisting of a carriage adapted to be connected to the frame of a bicycle, a driving-wheel mounted on said carriage, and a motor also mounted on said carriage for driving said wheel.

3. An attachment for a bicycle, consisting of a carriage, means for connecting the carriage to the frame of a bicycle, a single driving-wheel mounted on the carriage, a motor for driving the wheel, mounted on the carriage, and means extending into the reach of the rider, for controlling the motor.

4. A motor-carriage for a bicycle, having a frame, a driving-wheel, and a motor for the driving-wheel, in combination with a clamp for detachably securing the front of the carriage to the steering-head of the bicycle.

5. A motor-carriage for a bicycle, having a frame, a driving-wheel, and a motor for the driving-wheel, in combination with a detachable clamp for connecting the front end of the carriage with the steering-head of the bicycle, and a flexible cross-brace connecting the rear end of the carriage with the said bicycle.

6. A motor-carriage for a bicycle, having a frame, a driving-wheel, and a motor for driving said wheel, in combination with a detachable clamp connecting the front end of the carriage with the front of the bicycle, and a curved brace for connecting the carriage with the bicycle-frame, the said brace being so curved as to be out of the path of the bicycle-pedals.

7. A detachable motor-carriage for a bicycle, having a driving-wheel, a water-tank, a fuel-reservoir, and an engine, all for the purposes set forth.

8. A detachable carriage for a bicycle, having a driving-wheel, a water-tank, a fuel-reservoir, an engine, a steam-generator, and an automatic valve between the steam-generator and the water-tank.

9. A motor-carriage for a bicycle, having a tube forming a fuel-reservoir, and a water-tank, the two parts forming a frame, in combination with a driving-wheel journaled on the frame, an engine mounted on the same, a steam-generator having a combustion-chamber for the fuel from the reservoir, and a steam-chamber connected with the water-tank and with the engine.

10. The combination with the fuel-reservoir, and the water-tank, connected together to form a frame, of a driving-wheel journaled on the tank, an engine for driving the wheel, a steam-generator having a combustion-chamber for the fuel, and a pump operated by the engine, for forcing the water from the tank into the generator.

11. The combination with the motor-carriage, of a driving-wheel journaled on the carriage, an engine for driving the wheel, a steam-generator, a pump for forcing the water from the tank into the generator, and a valve interposed between the pump and generator for automatically cutting off the supply of water to said generator when the pressure of steam in the same is too great.

12. The combination with the motor-carriage, and a driving-wheel journaled thereon, of a steam-engine for driving said wheel, a tank for the water supply, a steam-generator, and a valve mechanism having a supply-pipe leading from the tank and having outlet-ducts communicating with the generator and with the tank respectively, and a valve for shutting off either of the two outlet-ports, substantially as set forth.

13. The combination with the motor-carriage, a driving-wheel journaled thereon, a steam-engine for driving said wheel, a tank for the water supply, and a steam-generator, of a valve mechanism having a supply-pipe leading from the tank and having outlet-ducts communicating with the generator and the tank respectively, and a valve operating to close either of said ducts, and said valve mechanism having a means under control of the pressure of steam in the steam-chamber for automatically operating the valve.

14. A motor-carriage for a bicycle, provided with a frame, a driving-wheel, an engine, a steam-generator, and a valve for controlling the admission of steam from the generator to the engine and from the generator to an exhaust-duct, in combination with a lever extending into position to be grasped by the rider and connected with the valve.

15. A motor-carriage provided with a frame, a driving-wheel, and an engine, of a steam-generator having a steam-chamber and a combustion-chamber, and a movable cap for the combustion-chamber connected with the fuel supply and provided with a burner, for the purposes set forth.

In testimony whereof I have signed my name to this specification, in the presence of two subscribing witnesses, this 1st day of June, A. D. 1896.

ISAAC H. DAVIS.

Witnesses:
 HORACE BROWN,
 A. D. HARRISON.